G. EDICK & J. E. DAVERN.
GOLD SAVING DEVICE.
APPLICATION FILED SEPT. 24, 1915.
1,178,001.
Patented Apr. 4, 1916.
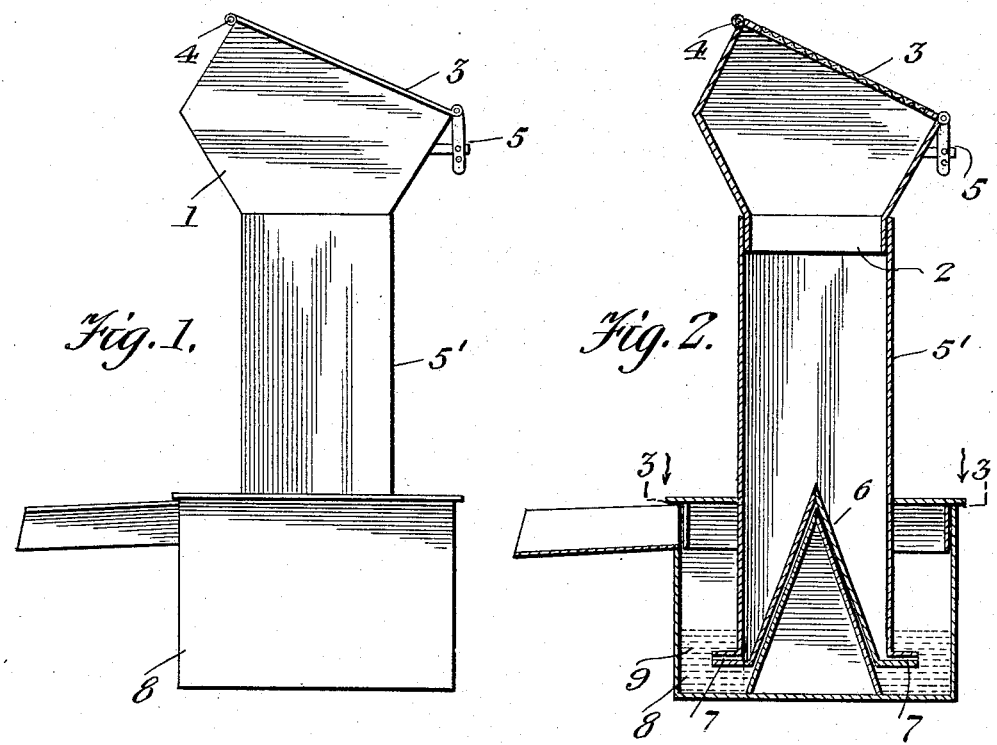
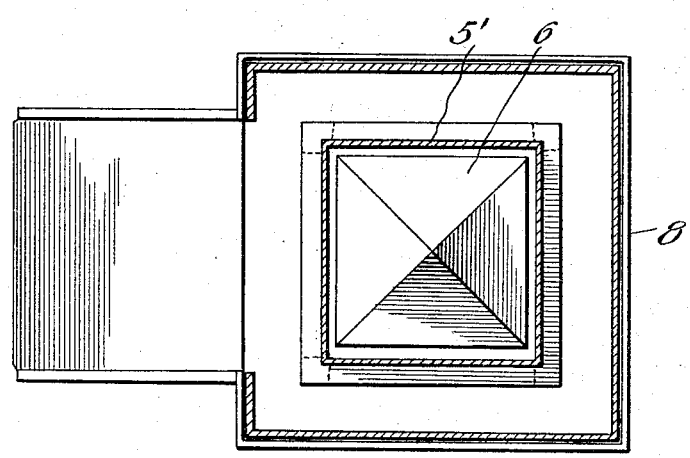
Witness
C. M. Fischer
C. C. Hines
Inventors
George Edick
John E. Davern
By Victor J. Evans
Attorney

UNITED STATES PATENT OFFICE.

GEORGE EDICK AND JOHN E. DAVERN, OF ALBUQUERQUE, NEW MEXICO.

GOLD-SAVING DEVICE.

1,178,001.

Specification of Letters Patent.

Patented Apr. 4, 1916.

Application filed September 24, 1915. Serial No. 52,482.

*To all whom it may concern:*

Be it known that we, GEORGE EDICK and JOHN E. DAVERN, citizens of the United States, residing at Albuquerque, in the county of Bernalillo and State of New Mexico, have invented new and useful Improvements in Gold-Saving Devices, of which the following is a specification.

This invention relates to a device adapted to be employed in gold extraction for the saving of float or flour gold, commonly lost in ordinary extraction processes.

In the art of extracting gold from ores, sand, etc., it is well known that a large amount of the very fine gold is lost, except in cyaniding, which is an exception to the rule but a comparatively expensive process, owing to the inability of the types of extraction or recovery apparatus in use to take care of the very fine flour or float gold.

The object of our invention is to provide a separating device which is adapted and designed especially for the treatment of fine matter containing fine gold, by which the gold ordinarily allowed to go to waste will be separated from the foreign material and saved.

The invention consists of the features of construction, combination and arrangement of parts herein fully described and claimed, reference being had to the accompanying drawing in which:—

Figure 1 is a side elevation of a gold saving extractor or separator embodying our invention. Fig. 2 is a vertical longitudinal section of the same. Fig. 3 is a sectional plan view on the line 3—3 of Fig. 2.

Referring to the drawing, 1 designates a hopper having an outlet 2 at its lower end and provided at its top with an inclined screen surface 3. In practice the solution containing fine sand, flour gold, etc., is conducted over the surface of this screen, through which the water, fine gold and fine foreign materials pass into the hopper, the coarser foreign materials being rejected. The screen may be of any suitable mesh and sloped or inclined as desired. In the present instance the screen is shown as hinged at 4 and adjustable fastening means 5 are provided for varying or regulating the inclination thereof as desired. Of course, the screen may be either adjustable or fixed, as occasion may require.

The outlet 2 of the hopper discharges into the upper end of a column 5', preferably of rectangular or oblong rectangular form in cross section, and into which the solution passes by gravity. At the bottom of this column is an upstanding tapering deflector 6, preferably pyramidal in form, its sides being equal in number to the sides of the column 5'. The sloping sides of this deflector guide the material to a series of outlets 7 equal in number to the sides of the column and deflector and formed by horizontal flanges projecting from the adjacent sides of said parts and defining narrow elongated horizontal exits into the body of mercury, whereby the material is discharged into a mercury receptacle 8. This receptacle contains a body of mercury 9 in which the lower end of the column is submerged up to a point above the level of the outlets 7.

It will be understood from the foregoing description that the fine material passing through the screen 3 into the column 5' falls upon the deflector 6 and is conveyed to and discharged through the respective outlets 7 into the body of mercury in the pan or receptacle 8. The mercury takes up the fine gold in the well known way, and at suitable intervals this gold may be recovered and the pan or receptacle relieved of its refuse material. It will be evidence that by this construction all of the fine flour or float gold will be recovered, thus preventing the losses which usually occur.

We claim:—

A device for separating float or flour gold from fine foreign substances, comprising a mercury receptacle, a vertical column extending downwardly into said receptacle and provided with a plurality of sides, a pyramidal deflector extending upwardly into the lower end of the mercury column, said deflector having a series of sloping sides equal in number to the sides of the column and sloping toward the lower ends
5 thereof, the deflector being provided with horizontal flanges defining narrow elongated horizontal exits into the body of mercury, and an inlet at the top of the column.

In testimony whereof we affix our signatures in presence of two witnesses.

GEORGE EDICK.
JOHN E. DAVERN.

Witnesses:
T. L. McSPADDEN,
CHAS. HEWITT.

Copies of this patent may be obtained for five cents each, by addressing the "Commissioner of Patents, Washington, D. C."